United States Patent [19]
Lispi

[11] Patent Number: 5,645,305
[45] Date of Patent: Jul. 8, 1997

[54] SHOVEL FOR GAINING INCREASED LEVERAGE

[76] Inventor: Robert Lispi, 20212 Red Cedar Dr., Walnut, Calif. 91789

[21] Appl. No.: 656,830

[22] Filed: Jun. 3, 1996

[51] Int. Cl.⁶ .................................................. A01B 1/00
[52] U.S. Cl. .................................. 294/58; 294/60
[58] Field of Search .................. 294/49, 58–60; 254/131.5, 132; 172/371; 16/110 R

[56] References Cited

U.S. PATENT DOCUMENTS

| | | | |
|---|---|---|---|
| D. 198,979 | 8/1964 | Petoe | 294/60 |
| 212,953 | 3/1879 | Kreider | 294/60 |
| 821,847 | 5/1906 | Arnavat | 294/60 |
| 1,931,349 | 10/1933 | Habig | 294/60 |
| 3,014,750 | 12/1961 | Briggs | 294/58 |
| 3,136,574 | 6/1964 | Pasquale | 2944/58 |
| 5,503,445 | 4/1996 | Fontaine | 294/60 |

FOREIGN PATENT DOCUMENTS

| | | | |
|---|---|---|---|
| 547775 | 9/1942 | United Kingdom | 254/131.5 |
| 810800 | 3/1959 | United Kingdom | 294/60 |
| 2132061 | 7/1984 | United Kingdom | 294/60 |

*Primary Examiner*—Dean Kramer

[57] ABSTRACT

The present device relates to a shovel which enables a user to gain an increased amount of leverage. In its broadest context, the present invention includes a handle having a hand hold at one end thereof and an inner connection member at the opposite end thereof. This inner connection member includes both a tubular sleeve component and an arch component. A rectangular planar grip spans the intermediate extent of the arch component. Furthermore, a foot rest spans the intermediate extent of the arch component approximate the closed end. This foot rest includes a surface depression with a number of texture-creating protrusions formed thereon. Furthermore, a blade is secured to the bottom end of the foot rest.

2 Claims, 3 Drawing Sheets

SHOVEL FOR GAINING INCREASED LEVERAGE

BACKGROUND OF THE INVENTION

1. Field of the Invention

The present invention relates to a new and improved shovel for gaining increased leverage and, more particularly, pertains to a shovel which enables a user to gain more leverage when digging.

2. Description of the Prior Art

The use of shovels is known in the prior art. More specifically, shovels heretofore devised and utilized for the purpose of utilizing a shovel with an angled blade portion are known to consist basically of familiar, expected, and obvious structural configurations, notwithstanding the myriad of designs encompassed by the crowded prior art which has been developed for the fulfillment of countless objectives and requirements.

The prior art discloses a large number of devices for a shovel for gaining an increased amount of leverage. By way of example, U.S. Pat. No. 4,904,011 to Hawk; U.S. Pat. No. 5,197,772 to Stecyk; and U.S. Pat. No. 4,050,727 to Bonnes each disclose various shovel constructions. Furthermore, U.S. Design Pat. No. 245,664 to Holcombe; and U.S. Pat. No. 4,180,289 to Saine each disclose digging and/or grinding tools. Lastly, U.S. Pat. No. 5,009,378 to Linsmeyer et al. discloses a device for holding refuge bags in their open positions.

In this respect, the shovel for gaining increased leverage according to the present invention substantially departs from the conventional concepts and designs of the prior art, and in doing so provides an apparatus primarily developed for the purpose of gaining an increased amount of leverage when digging.

Therefore, it can be appreciated that there exists a continuing need for a new and improved shovel for gaining increased leverage which can be used for gaining an increased amount of leverage when digging. In this regard, the present invention substantially fulfills this need.

SUMMARY OF THE INVENTION

In view of the foregoing disadvantages inherent in the known types of shovels now present in the prior art, the present invention provides an improved shovel for gaining increased leverage. As such, the general purpose of the present invention, which will be described subsequently in greater detail, is to provide a new and improved shovel for gaining increased leverage when digging and methods which have all the advantages of the prior art and none of the disadvantages.

To attain this, the present invention essentially comprises a new and improved shovel which enables a user to gain more leverage when digging. The shovel includes a handle having a first end and a second end and an intermediate extent therebetween. Furthermore, a hand hold is coupled to the first end of the this handle. An inner connection member including a tubular sleeve component and an arch component, wherein the arch component includes a closed end and an open end and an intermediate extent therebetween is secured to the handle. More specifically, the closed end of the arch is secured to the tubular sleeve component and the tubular sleeve component is inserted over and secured to the second end of the handle. A planar rectangular grip which spans the intermediate extent of the arch component approximate the closed end is for use in gaining an increased amount of leverage. Similarly, a foot rest spans the intermediate extent of the arch component approximate the closed end with the foot rest having a central portion and an upper surface, a top and a bottom, and a surface depression formed within the central portion of the foot rest. This depression extends away from the closed end of the arch and includes a number of texture-creating protrusions positioned upon the upper surface. A blade which is defined by a first end and a second end and with an intermediate extent therebetween is secured to the bottom of the foot rest.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shovel for gaining increased leverage which has all the advantages of the prior art shovels and none of the disadvantages.

It is another object of the present invention to provide a new and improved shovel for gaining increased leverage which may be easily and efficiently manufactured and marketed.

It is a further object of the present invention to provide a new and improved shovel for gaining increased leverage which is of a durable and reliable construction.

An even further object of the present invention is to provide a new and improved shovel for gaining increased leverage which is susceptible of a low cost of manufacture with regard to both materials and labor, and which accordingly is then susceptible of low prices of sale to the consuming public, thereby making such shovels economically available to the buying public.

Still yet another object of the present invention is to provide a new and improved shovel for gaining increased leverage which provides in the apparatuses and methods of the prior art some of the advantages thereof, while simultaneously overcoming some of the disadvantages normally associated therewith.

Even still another object of the present invention is to gain an increased amount of leverage through a new and improved shovel.

Lastly, it is an object of the present invention to provide a shovel with means to gain an increased amount of leverage. In its broadest context, the present invention includes a handle having a hand hold at one end thereof and an inner connection member at the opposite end thereof. This inner connection member includes both a tubular sleeve component and an arch component. A rectangular planar grip spans the intermediate extent of the arch component. Furthermore, a foot rest spans the intermediate extent of the arch component approximate the closed end. This foot rest includes a surface depression with a number of texture-creating protrusions formed thereon. Furthermore, a blade is secured to the bottom end of the foot rest.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
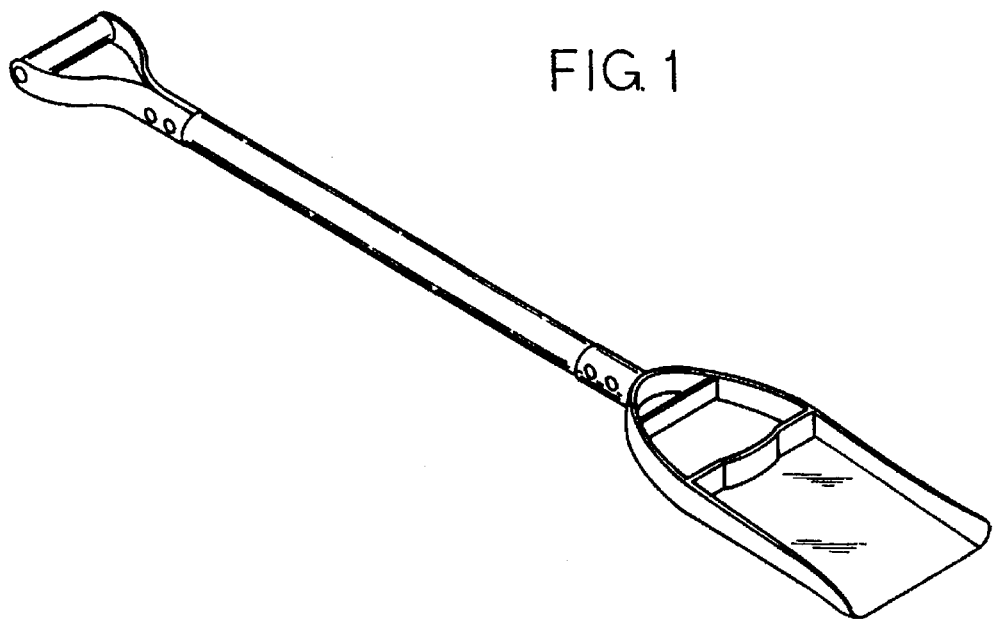
FIG. 1 is a perspective view of the shovel for gaining increased leverage constructed in accordance with the principles of the present invention.
Figure 2:
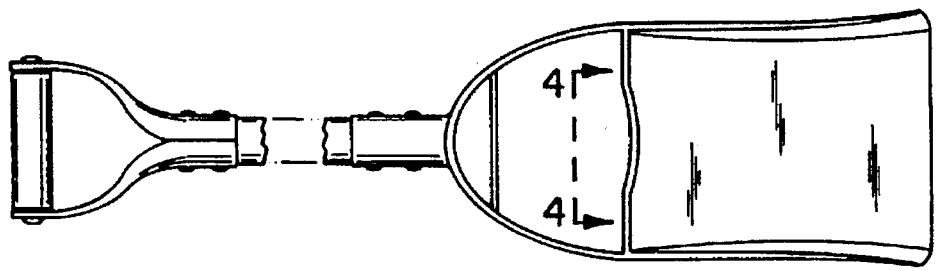
FIG. 2 illustrates a plan view of the shovel of the present invention.
Figure 3:
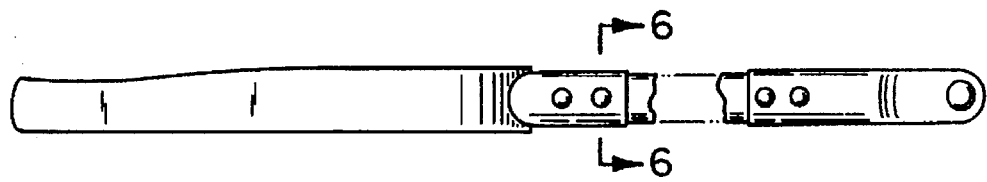
FIG. 3 illustrates a side view of the shovel in accordance with the present invention.
Figure 4:
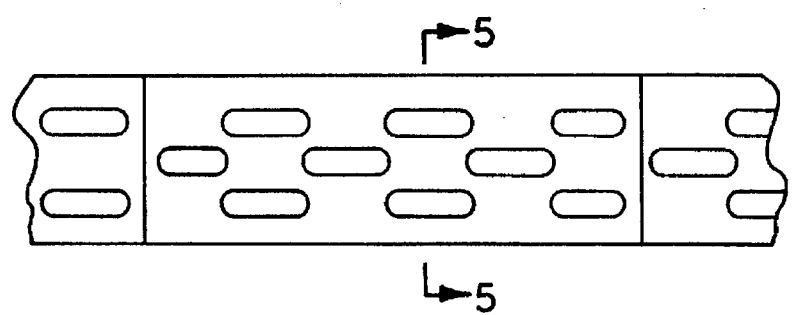
FIG. 4 is a view taken along line 4—4 of FIG. 2.
Figure 5:
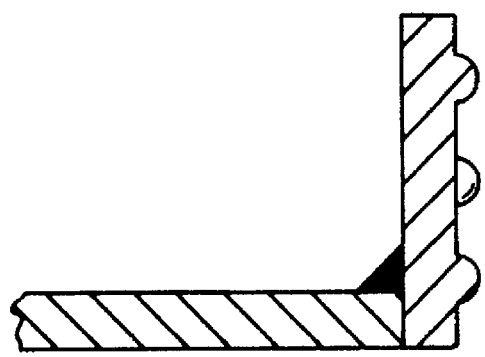
FIG. 5 is a view taken along line 5—5 of FIG. 4.
Figure 6:
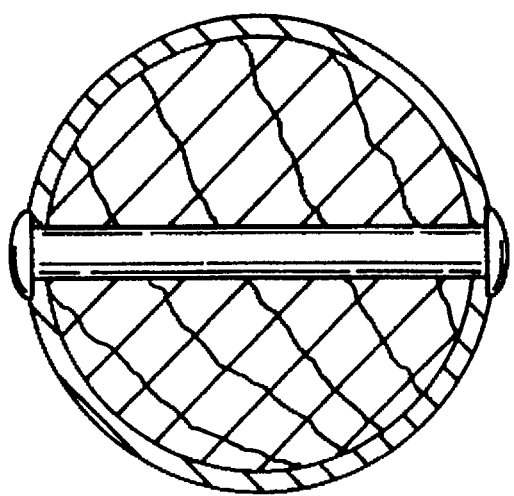
FIG. 6 is a view taken along line 6—6 of FIG. 3.

With reference now to the drawings, and in particular to FIG. 1 thereof, the preferred embodiment of the new and improved shovel for gaining increased leverage embodying the principles and concepts of the present invention and generally designated by the reference numeral 10 will be described.

The present device relates to a shovel which enables a user to gain an increased amount of leverage when digging. In its broadest context, the device includes a handle having a hand hold at one end thereof and an inner connection member at the opposite end thereof. This inner connection member includes both a foot rest and a rectangular grip. Both the foot rest and the grip are for use in enabling a user to gain increased leverage when digging. The various components of the present invention, and the manner in which they interrelate, will be described in greater detail hereinafter.

The handle 20 is defined by a first end 22, a second end 24 with an intermediate extent therebetween. Furthermore, a hand hold 26 is coupled to the first end of the handle. This hand hold is for use in enabling a user to get a secure grip upon the first end of the handle. An inner connection member 28 is positioned opposite the hand hold 26. This inner connection member 28 is defined by a tubular sleeve component 32 and an arch component 34. Furthermore, the arch component is defined by a closed end 36 and an open end 38 with an intermediate extent therebetween. The closed end 36 of the arch 34 is secured to the tubular sleeve component 32. Furthermore, this tubular sleeve component 32 is inserted over and secured to the second end 24 of the handle 20. A number of rivets can be employed in securing the tubular sleeve 32 to the second end 24 of the handle 20.

A substantially planar rectangular grip 42 spans the intermediate extent of the arch component 34 approximate the closed end 36. As indicated hereinabove, this grip 42 enables a user to gain an increased amount of leverage when employing the shovel. Additionally, a foot rest 44 spans the intermediate extent of the arch 34 approximate the closed end 36. This foot rest 44 has a central portion, an upper surface, a top and a bottom. A surface depression 46 is formed within the central portion of the foot rest 44. This depression 46 extends away from the closed end 36 of the arch 34. Additionally, texture-creating protrusions 48 can be positioned upon the upper surface of the foot rest to increase the amount of friction created between the foot of the user and the foot rest 44. Lastly, a blade 52 which is defined by a first end and second end and an intermediate extent therebetween is secured to the bottom of the foot rest.

Thus, what has been described is a shovel with both a grip 42 and a foot rest 44 which can be employed in gaining an increased amount of leverage. Specifically, if an operator is using the shovel in a conventional manner and wishes to gain an increased amount of force at the second end of the blade 52, they may employ the foot rest 44 for delivering power to the second end of the blade 52. To facilitate its use the foot rest 44 includes both a surface depression 46 with a number of protrusions 48 formed thereon. Alternatively the user of the shovel may employ the rectangular grip 42. Thus, if the shovel is being used in a conventional manner and one wishes to deliver the increased amount of force to the second end of the blade, he or she may use one of his or her hands to deliver an increased amount of force by way of the rectangular grip 42. Moreover, the arch component 34, or stirrup, serves to protect the foot of the user when they are employing the shovel of the present invention. More specifically, one of the stirrups primary functions is to keep the user's foot from slipping off the shovel and possibly injuring his or her foot.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved shovel which enables a user to gain more leverage when digging, the shovel comprising, in combination:

a handle having a first end and a second end and an intermediate extent therebetween, a hand hold coupled to the first end of the handle;

an inner connection member including a tubular sleeve component and an arch component, the arch component having a closed end and an open end an intermediate extent therebetween, the closed end of the arch secured to the tubular sleeve component, the tubular sleeve component inserted over and secured to the second end of the handle;

a planar rectangular grip spanning the intermediate extent of the arch component approximate the closed end;

a foot rest spanning the intermediate extent of the arch component approximate the closed end, the foot rest having a central portion and an upper surface, a top and a bottom, a surface depression formed within the central portion of the foot rest, the depression extending away from the closed end of the arch, texture-creating protrusions positioned upon the upper surface of the foot rest; and a blade having a first end and a second end and an intermediate extent therebetween, the first end of the blade secured to the bottom of the foot rest.

2. A shovel which enables a user to gain more leverage when digging, the shovel comprising:

a handle having a first end and a second end and an intermediate extent therebetween;

an inner connection member including a tubular sleeve component and an arch component, the arch component having a closed end and an open end and an intermediate extent therebetween, the closed end of the arch secured to the tubular sleeve component, the tubular sleeve component inserted over and secured to the second end of the handle;

a foot rest spanning the intermediate extent of the arch component approximate the closed end, the foot rest having a central portion and an upper surface, a top and a bottom, a surface depression formed within the central portion of the foot rest, the depression extending away from the closed end of the arch; and a blade having a first end and a second end and an intermediate extent therebetween, the first end of the blade secured to the bottom of the foot rest:

a planar rectangular grip spanning the intermediate extent of the arch component approximate the closed end.

* * * * *